United States Patent
Hudson et al.

(10) Patent No.: US 10,397,883 B2
(45) Date of Patent: Aug. 27, 2019

(54) TRANSMISSION POWER CONTROL BASED ON POSITION OF MOVING PLATFORM AND PREVAILING EMISSION RESTRICTIONS

(71) Applicant: BAE SYSTEMS PLC, London (GB)

(72) Inventors: Peter Noble Hudson, Preston (GB); Rania Hamdi Eissa, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/747,676

(22) PCT Filed: Aug. 10, 2016

(86) PCT No.: PCT/GB2016/052483
§ 371 (c)(1),
(2) Date: Jan. 25, 2018

(87) PCT Pub. No.: WO2017/025744
PCT Pub. Date: Feb. 16, 2017

(65) Prior Publication Data
US 2018/0227860 A1    Aug. 9, 2018

(30) Foreign Application Priority Data

Aug. 13, 2015 (GB) .................................. 1514461.1
Sep. 7, 2015 (EP) .................................. 15184043

(51) Int. Cl.
*H04W 52/34* (2009.01)
*H04W 84/06* (2009.01)
(Continued)

(52) U.S. Cl.
CPC ........ *H04W 52/34* (2013.01); *H04B 7/18506* (2013.01); *H04W 84/005* (2013.01)

(58) Field of Classification Search
CPC ............ H04B 7/18506; H04B 7/18508; H04B 7/0608; H04B 1/1638; H04B 1/3822;
(Continued)

(56) References Cited

U.S. PATENT DOCUMENTS 2,062,003 A   11/1936   Hammond, Jr.
4,100,472 A    7/1978   Mobley
(Continued)

FOREIGN PATENT DOCUMENTS

EP   0481171 A2   4/1992
EP   0532383 A1   3/1993
(Continued)

OTHER PUBLICATIONS

International Search Report and Written Opinion of International Application No. PCT/GB2016/052371, dated Oct. 26, 2016, 14 pages.
(Continued)

*Primary Examiner* — Philip Sobutka
(74) *Attorney, Agent, or Firm* — Maine Cernota & Rardin (57) ABSTRACT

Apparatus for a communications system of a moving platform comprising a plurality of systems, at least one platform application, and a communications module comprising at least one wireless communications link and configured to effect wireless data communication, wherein said apparatus comprises a communications planning module configured to: —receive data representative of a communications requirement between said platform and a recipient node; —identify a communications link for supporting said communications requirement; —determine, using attribute data representative of a position and/or orientation of said platform relative to said recipient node, a distance and direction of said recipient node with respect to said platform; —receive data representative of prevailing emissions control
(Continued)

restrictions including an upper emissions limit defining a maximum transmission power permitted N to be utilized by an on-board antenna or portion of aperture antenna; —determine a best achievable transmission power, within said upper emissions limit, of said identified communications link taking into account at least said distance of said recipient node with respect to said platform; and —cause the transmission power of said identified communications link to be set to said best achievable transmission power.

14 Claims, 6 Drawing Sheets

(51) Int. Cl.
*H04B 7/185* (2006.01)
*H04W 84/00* (2009.01)

(58) Field of Classification Search
CPC .. H04B 1/3838; H04B 7/0695; H04B 7/0802; H04B 7/088; H04B 7/15528; H04B 7/18504; H04W 84/005; H04W 40/20; H04W 52/283; H04W 4/04; H04W 64/00; H04W 84/06; H04W 4/029; H04W 4/046; H04W 4/30; H04W 4/40; H04W 52/34
USPC ............ 455/456.1, 522, 431, 11.1, 41.2, 411
See application file for complete search history.

(56) References Cited

U.S. PATENT DOCUMENTS

| | | | |
|---|---|---|---|
| 6,026,097 A | | 2/2000 | Voois |
| 6,115,580 A | | 9/2000 | Chuprun et al. |
| 7,072,977 B1 | | 7/2006 | Bernard et al. |
| 7,151,749 B2 | | 12/2006 | Vega-Garcia |
| 8,005,418 B2 | | 8/2011 | Walker |
| 8,554,264 B1 | | 10/2013 | Gibbons et al. |
| 2002/0142773 A1 | | 10/2002 | Rudrapatna et al. |
| 2002/0164981 A1 | | 11/2002 | Parkman |
| 2003/0073406 A1 | | 4/2003 | Benjamin |
| 2005/0202827 A1 | | 9/2005 | DeMarco et al. |
| 2006/0030350 A1* | | 2/2006 | Mitchell ............ H04W 52/146 455/522 |
| 2006/0168592 A1 | | 7/2006 | Andrews et al. |
| 2007/0064604 A1 | | 3/2007 | Chen |
| 2007/0168090 A1 | | 7/2007 | DeMarco et al. |
| 2007/0258445 A1 | | 11/2007 | Smith |
| 2007/0258486 A1 | | 11/2007 | Smith |
| 2007/0291647 A1 | | 12/2007 | Smith |
| 2007/0291767 A1 | | 12/2007 | Smith |
| 2007/0291768 A1 | | 12/2007 | Galliscio |
| 2007/0291780 A1 | | 12/2007 | Smith |
| 2007/0297416 A1 | | 12/2007 | Boley |
| 2008/0026767 A1 | | 1/2008 | Krstulich |
| 2008/0204279 A1 | | 8/2008 | Bourgault |
| 2009/0079631 A1 | | 3/2009 | Hurst |
| 2009/0185617 A1 | | 7/2009 | Houghton et al. |
| 2009/0326735 A1 | | 12/2009 | Wood |
| 2010/0057278 A1 | | 3/2010 | Lee |
| 2010/0094485 A1 | | 4/2010 | Verlut et al. |
| 2010/0220648 A1 | | 9/2010 | Persson |
| 2010/0278086 A1 | | 11/2010 | Pochiraju |
| 2010/0323715 A1 | | 12/2010 | Winters |
| 2011/0255506 A1 | | 10/2011 | Toth |
| 2012/0078453 A1 | | 3/2012 | Daum et al. |
| 2012/0257657 A1 | | 10/2012 | Subrahmanya et al. |
| 2012/0268319 A1 | | 10/2012 | Mitchell |
| 2013/0041529 A1 | | 2/2013 | He |
| 2013/0095822 A1 | | 4/2013 | Swardh |
| 2013/0324070 A1 | | 12/2013 | Bennett et al. |
| 2014/0014787 A1 | | 1/2014 | Chen |
| 2014/0075506 A1 | | 3/2014 | Davis |
| 2014/0105054 A1 | | 4/2014 | Saegrov et al. |
| 2014/0142787 A1 | | 5/2014 | Tillotson |
| 2014/0218239 A1 | | 8/2014 | Sharawi et al. |
| 2014/0226584 A1 | | 8/2014 | Cullen et al. |
| 2014/0274180 A1* | | 9/2014 | DuBois ................ H04W 72/04 455/509 |
| 2014/0323038 A1 | | 10/2014 | Hubbell et al. |
| 2015/0043337 A1 | | 2/2015 | Kanamarlapudi |
| 2015/0102953 A1 | | 4/2015 | Stayton |
| 2015/0120087 A1 | | 4/2015 | Duan |
| 2015/0210387 A1 | | 7/2015 | Ling |
| 2015/0229376 A1 | | 8/2015 | Kikuchi |
| 2017/0034277 A1 | | 2/2017 | Jackson |
| 2017/0283038 A1 | | 10/2017 | Lin |

FOREIGN PATENT DOCUMENTS

| | | | |
|---|---|---|---|
| EP | 1519507 A2 | 3/2005 | |
| EP | 1630978 A2 | 3/2006 | |
| EP | 2228868 A1 | 9/2010 | |
| EP | 2378676 A1 | 10/2011 | |
| EP | 2450862 A1 | 5/2012 | |
| EP | 2469291 A1 | 6/2012 | |
| EP | 2779480 A2 | 9/2014 | |
| EP | 2822187 A1 | 1/2015 | |
| EP | 2869479 A1 | 5/2015 | |
| EP | 2933931 A2 | 10/2015 | |
| GB | 2493779 A | 2/2013 | |
| JP | 2001153596 A | 6/2001 | |
| JP | 2010171496 A | 8/2010 | |
| TW | 201321916 A | 6/2013 | |
| WO | 2006130272 A2 | 12/2006 | |
| WO | 2007021411 A2 | 2/2007 | |
| WO | 2007110607 A1 | 10/2007 | |
| WO | 2010147986 A1 | 12/2010 | |
| WO | 2011075869 A1 | 6/2011 | |
| WO | 2012145570 A1 | 10/2012 | |
| WO | 2015117284 A1 | 8/2015 | |

OTHER PUBLICATIONS

Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.
Chen-Mou Cheng et al: "Transmit Antenna Selection Based on Link-layer Channel Probing", World of Wireless, Mobile and Mul- (56) References Cited

OTHER PUBLICATIONS timedia Networks, 2007. WOWMUM 2007. IEEE International Symposium on a, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.
International Preliminary Report on Patentability of International Application No. PCT/GB2016/052379, dated Feb. 22, 2018, 7 pages.
International Preliminary Report on Patentability of International Application No. PCT/GB2016/052371, dated Feb. 22, 2018, 10 pages.
International Preliminary Report on Patentability of International Application No. PCT/GB2016/052374, dated Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.
International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.

* cited by examiner

TRANSMISSION POWER CONTROL BASED ON POSITION OF MOVING PLATFORM AND PREVAILING EMISSION RESTRICTIONS

RELATED APPLICATIONS

This application is a national phase application filed under 35 USC § 371 of PCT Application No. PCT/GB2016/052483 with an International filing date of Aug. 10, 2016 which claims priority of GB Patent Application 1514461.1 filed Aug. 13, 2015 and EP Patent Application 15184043.6 filed Sep. 7, 2015. Each of these applications is herein incorporated by reference in its entirety for all purposes.

This invention relates generally to an apparatus and method for communications management and information and, more particularly, but not necessarily exclusively, to an apparatus and method for management of wireless communications resources between a node on a moving platform and at least one remote recipient.

There are many applications in which it is required to apply a level of management in respect of wireless communications and the management of information, particularly between nodes of a moving platform and one or more remote recipient(s), and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communications link between the aerial vehicle and a ground station, for example, and unexpected loss or degradation of such a communications link can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, pop-up threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective. For example, a communications link can become degraded or lost due to interference, jamming and weather, for example. In another example, a link degrades due to the distance between nodes being greater than their communications capability, as one or both nodes move further apart.

Traditionally in extreme cases, a platform operates in silence, in order to avoid being detected or intercepted, during emissions control (EMCON). However, if the communications were able to adapt accordingly, such that its emissions adheres to the imposed EMCON, for example by adapting the transmission power of the communications link, it may still be possible to maintain communications without violating emissions control.

In accordance with an aspect of the present invention, there is provided apparatus for a communications system of a moving platform comprising a plurality of systems, at least one platform application, and a communications module comprising at least one wireless communications link and configured to effect wireless data communication, wherein said apparatus comprises a communications planning module configured to:
  receive data representative of a communications requirement between said platform and a recipient node;
  identify a communications link for supporting said communications requirement;
  determine, using attribute data representative of a position and/or orientation of said platform relative to said recipient node, a distance and direction of said recipient node with respect to said platform;
  receive data representative of prevailing emissions control restrictions including an upper emissions limit defining a maximum transmission power permitted to be utilised by an on-board antenna or portion of aperture antenna;
  determine a best achievable transmission power, within said upper emissions limit, of said identified communications link taking into account at least said distance of said recipient node with respect to said platform; and
  cause the transmission power of said identified communications link to be set to said best achievable transmission power.

In an exemplary embodiment of the present invention, the communications planning module is configured to receive updated data representative of prevailing emissions control restrictions, including an updated upper emissions limit, determine a new best achievable transmission power, within said upper emissions limit, and cause the transmission power of said identified communications link to be set to said new best achievable transmission power. In an exemplary embodiment, the upper emissions limit may further include an emissions duration value. In an exemplary embodiment, the apparatus may be configured to predict said attribute data from past trajectory and heading data in respect of said recipient node and/or infer said attribute data from previously-received messages from said recipient node.

The apparatus may be configured to obtain said attribute data by accessing or retrieving, from a storage module, position and/or orientation data in respect of said recipient node.

The apparatus may be configured to receive position and/or orientation data from said platform and/or said recipient node.

Optionally, the apparatus may be further configured to determine said optimal transmission power using data representative of one or more of: relative distance between said platform and said recipient node, relative distance between said platform and an emissions control region/adversary node, current/estimated signal quality at said recipient node, transmission power range of said communications link, platform power budget, antenna gain, antenna pointing, losses (e.g. antenna pointing loss, atmospheric loss, free-space propagation loss), and communications requirements of said at least one platform application.

The apparatus may be configured to receive data representative of said current signal quality from said recipient node, and to selectively alter said optimal transmission power on the basis of said received data.

Alternatively, the apparatus may be configured to receive data representative of a current signal quality from said communications link on said platform, and to selectively alter said optimal power transmission power on the basis of said received data.

In an exemplary embodiment, the apparatus may be configured to detect a change in distance and/or direction between said platform and said recipient node, determine a revised optimal transmission power, and cause said transmission power of said identified transmitter to be set to said revised optimal transmission power.

The apparatus may be configured to determine said optimal transmission power using data representative of prevailing emissions control restrictions in respect of said platform and/or said recipient node.

Optionally, the apparatus may be configured to generate a transmission power control plan using said optimal transmission power, and transmit said transmission power control plan to a power controller of said communications system.

In accordance with another aspect of the present invention, there is provided an intelligent communications management system for a moving platform comprising a communications system, a plurality of functional systems and at least one wireless communications link and being configured to effect wireless data communication, the system further comprising apparatus substantially as described above.

In accordance with yet another aspect of the present invention, there is provided a method for communications management in a communications system of a moving platform comprising a plurality of systems, at least one platform application, and a communications module comprising at least one wireless communications link and configured to effect wireless data communication, the method comprising:

receiving data representative of a communications requirement between said platform and a recipient node;

identifying a communications link for supporting said communications requirement;

determining, using attribute data representative of a position and/or orientation of said platform relative to said recipient node, a distance and direction of said recipient node with respect to said platform;

receiving data representative of prevailing emissions control restrictions including an upper emissions limit defining a maximum transmission power permitted to be utilised by an on-board antenna or portion of aperture antenna;

determining a best achievable transmission power, within said upper emissions limit, of said identified communications link taking into account at least said distance of said recipient node with respect to said platform; and causing the transmission power of said identified communications link to be set to said optimal transmission power.

These and other aspects of the present invention will be apparent from the following specific description, in which embodiments of the present invention are described, by way of examples only, and with reference to the accompanying drawings, in which:

Exemplary embodiments of the present invention provide a method and/or apparatus configured to dynamically adjust the off-board transmission power of a communications system to optimise communications.

Power selection may be based on transmission power range for a communications link, current link performance, application communications requirements, such as bandwidth and latency requirements, node mobility (e.g. velocity) and constraints (e.g. transmission power budget, EMCON region).

Adaptive power control, in accordance with exemplary embodiments of the present invention, can be used to adjust the transmission power of a communications system to optimise communications. For example, the transmission power can be used to extend the communications range to reach distant node(s). In another example, it can be used to improve the reliability of a link; an increase in transmission power may result in increased quality of reception and hence, potentially higher throughputs at the intended receiver. In yet another example, to adjust the off-board transmission power using just enough power to fulfil information exchange, but not so much as to be detectable, so as to adhere to prevailing EMCON restrictions, wherein EMCON or 'emission control' policies and strategies are used to prevent detection, identification and location of a platform and/or minimise interference among the different moving platforms.

Traditionally, all aspects of communications, such as multiple, different communications links/radios, reside within the communications system. Each of the communications links/radios is an independent system and usually dedicated to transmitting specific messages. If, for example, an unexpected event occurs, such as a link failure or degradation, change in mission priorities and new operational constraints, the system is unable to adapt and respond accordingly to maintain adequate communications. The communications system is usually a dedicated system without much interaction, if not all, with other platform systems and avionics applications on the platform. Furthermore, in some cases, a higher-level planner is required, which resides outside the communications system, to meet the changing demands of the platform and new operational constraints. In contrast, in aspects of the present invention, it is recognised that all functions/systems on a platform (e.g. mission management, communications, airspace integration, and vehicle health management) work in concert to achieve mission objectives and to maintain integrity of the platform. For example, the communications system may inform the platform health management system when a lost link situation arises to ensure that communications failure will not lead to a catastrophe. Thus, and as will be described in more detail later, the communications system is concerned with low-level decision making, i.e. day-to-day running and decisions. However, if it is unable to resolve a communications issue, for example, all available links to it have failed or severely degraded links, then higher-level planning is invoked. In this case, a planning module according to an exemplary embodiment of the present invention is configured to select an optimal transmission power for a selected communications link, taking into account prevailing network performance, communications performance constraints, attenuation caused by bad weather and prevailing dynamic EMCON restrictions.

The operational environment can comprise a plurality of nodes, in the air and on the ground (e.g. airborne platform, mobile and/or fixed control station), for example. These nodes interact with each other over line-of-sight (LOS) or via relay(s), cooperatively working together sharing information, responsibilities and tasks, and exchanging command and control data. In general, a node has multiple communications links/radios to enable it to interact with other nodes via different networks, as required.

In the following description of the drawings, a communications management apparatus according to an exemplary embodiment of the invention will be described in relation to a UAV. However, it is to be understood that the present invention is not necessarily intended to be limited in this regard and, indeed, finds application in many other types of moving platform management systems in which it is required to manage communications in an intelligent manner and, for the avoidance of doubt, this would include land and sea-going vehicles, as well as manned aerial vehicles.

In the following description of the drawings, a communications management apparatus according to an exemplary embodiment of the invention will be described in relation to a UAV system. However, it is to be understood that the present invention is not necessarily intended to be limited in this regard and, indeed, finds application in many other types of mobile vehicle and fixed infrastructure systems in which it is required to manage communications in an intelligent manner and, for the avoidance of doubt, this would include manned and unmanned road and sea-going vehicles, ground-, sea- and airborne-control based infrastructure, as well as manned aerial vehicles.

Figure 1:
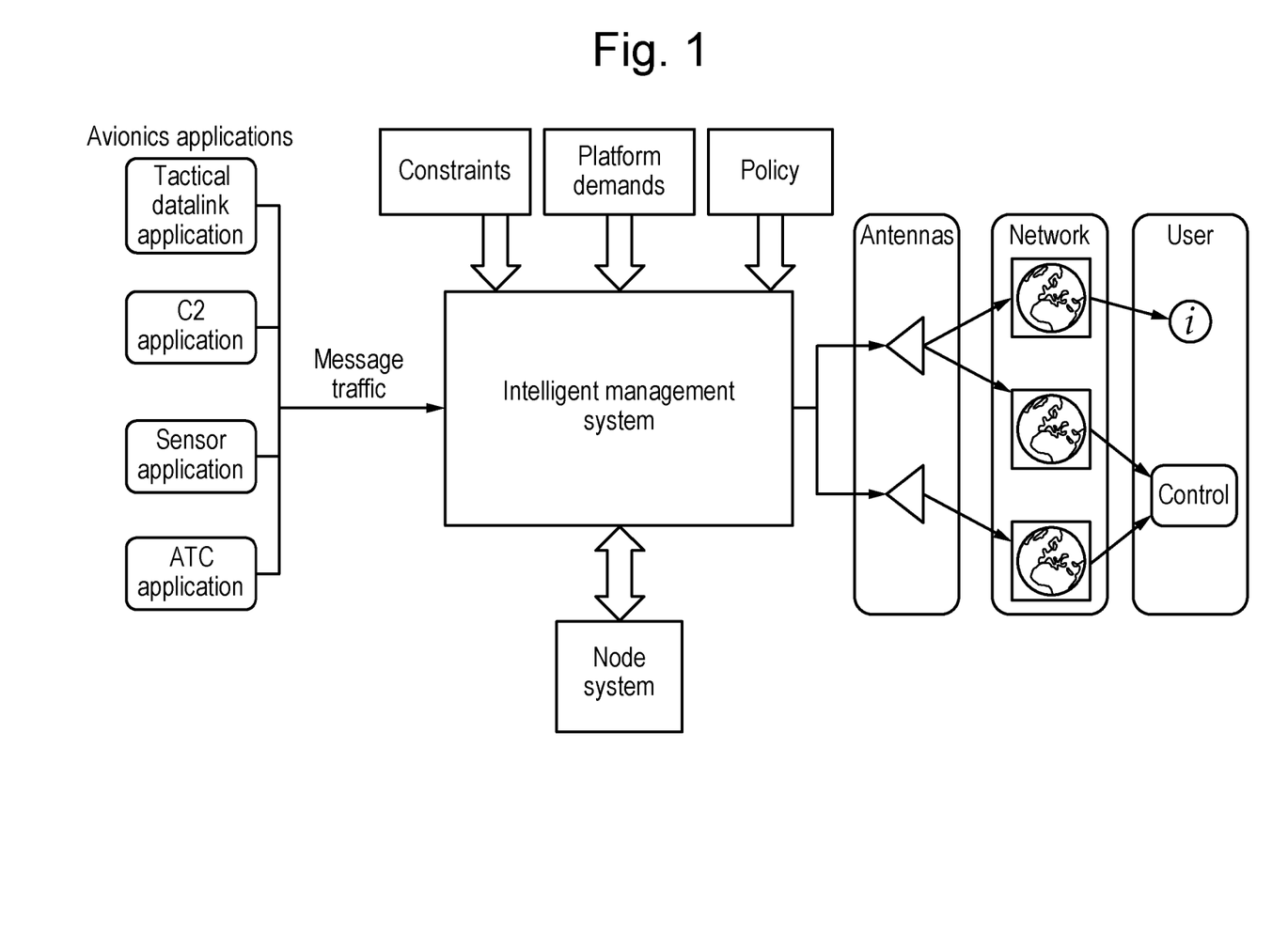
FIG. 1 is a schematic block diagram illustrating a moving platform management system, including apparatus according to an exemplary embodiment of the present invention.

Referring to FIG. 1 of the drawings, an intelligent management module 10, including apparatus according to an exemplary embodiment of an aspect of the present invention, is illustrated schematically at the centre of a typical UAV. The UAV comprises several systems/sub-systems, including communications, navigation system, prognostics and health, etc. Thus, in the schematic diagram of FIG. 1, the intelligent communications management module 10 is depicted as being communicably coupled to other parts 12 of the vehicle. It can be seen from the diagram that two-way data communication is provided between the node system 12 and the intelligent management module 10. The node system 12 may comprise a plurality of subsystems/systems, possibly including, but not necessarily limited to, a prognostics and health system, a navigation system, a control authority, e.g. pilot or an on-board authority with executive decision functionality, a utilities management system, defensive aids system, data transfer and recording system, and an HMI (Human Machine Interface) system. Any and all of these functional components are configured to provide information, such as navigation data and detected threat, to the intelligent communications management module 10 for use in its decision making.

The intelligent communications management module 10 is also configured to receive data from a plurality of avionics applications. Such avionics applications may, for example, comprise civil and/or military applications, such as tactical datalink applications 14, sensor applications 16 (e.g. video, images, etc), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not necessarily intended to be in any way limited in this regard.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas, etc). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the intelligent management module 10 (or at least dedicated thereto) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how links and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
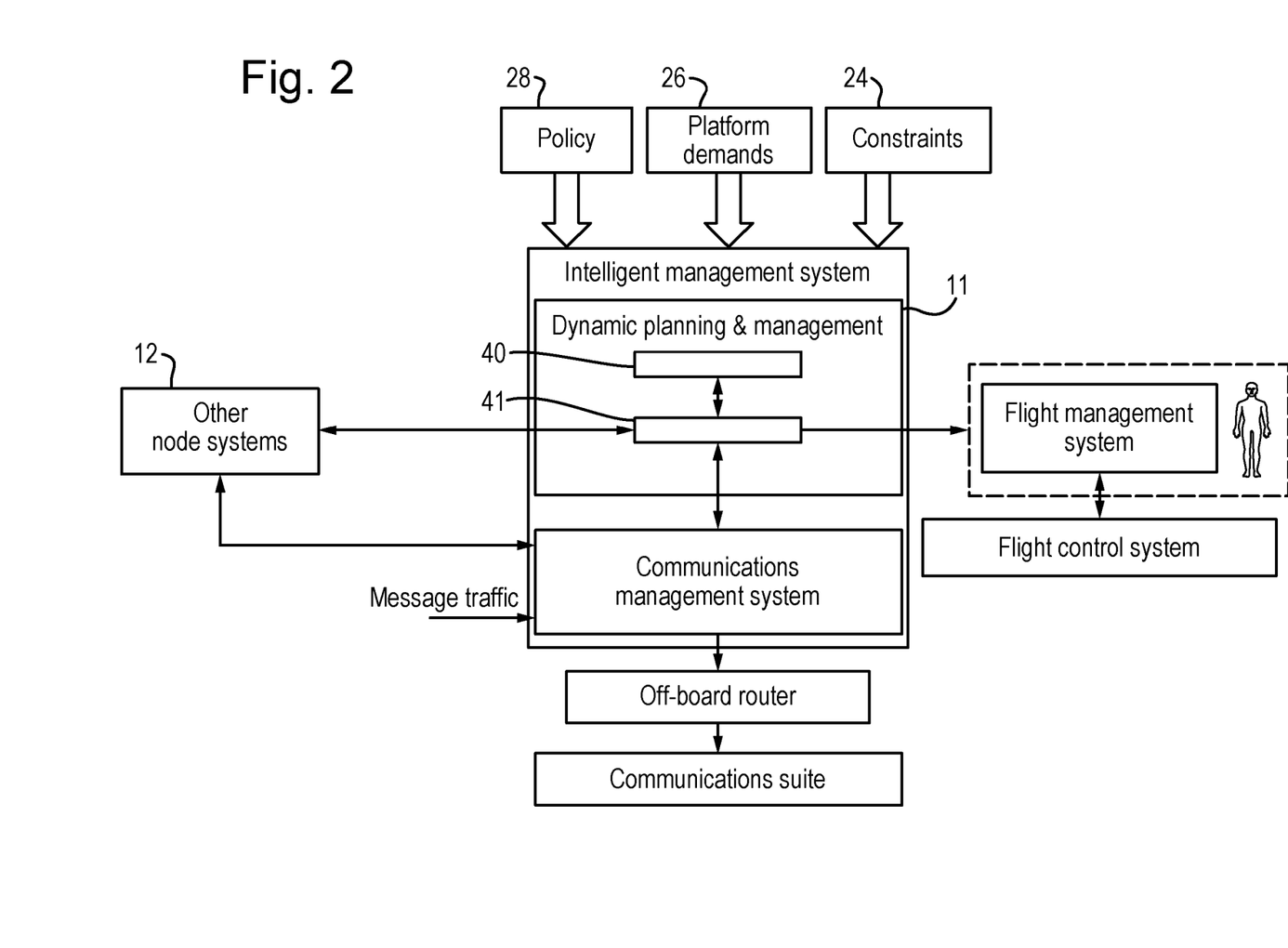
FIG. 2 is a schematic block diagram illustrating some principal features of the moving platform management system of FIG. 1 in more detail.
Figure 3:
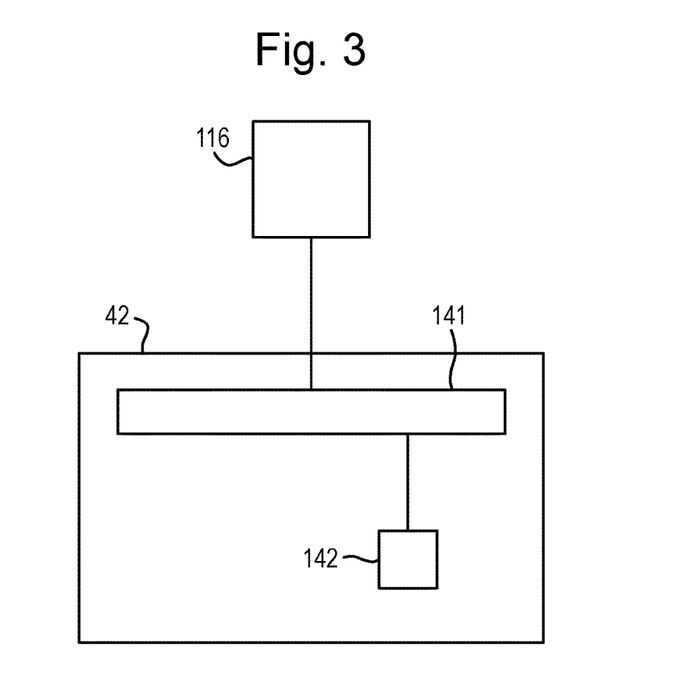
FIG. 3 is a schematic block diagram illustrating a communications executive function according to an exemplary embodiment of the present invention.

Thus, the Intelligent Communications Management System can be divided into two distinct parts with inputs and outputs to each other and other parts of the aircraft or ground-based system, as shown in FIG. 2. These two distinct parts may reside in different systems/subsystems of the aircraft or ground-based system, as shown in FIGS. 3A and 3B. For example the dynamic planning and management may reside in mission management subsystem/system, whilst the communications management module within the communications subsystem/system. Such an implementation is more applicable to Unmanned Air Systems (UAS). In another implementation, the above may reside in one box; this implementation may be appropriate for manned systems, such as a manned air vehicle.

Whilst EMCON conditions (and, therefore policies and strategies for implementing them) vary, according to the application as well as particular circumstances, the underlying principles of EMCON will be well known to a person skilled in the art. Setting EMCON requires four basic steps: criteria, objectives, notification and authority. The criteria specify the overarching planning, procedure and responsibility for EMCON policy or strategy. The objectives, as will be apparent, define the desired result of the EMCON policy or strategy and may include, for example, minimising detection by third party sensors, allowing effective command and control (C2) communications between nodes, supporting operational deception (OPDEC), supporting operations security (OPSEC), minimising interference among nodes, and degrading effectiveness of third party C2 communications. It is these objectives that may be used by a communications planning module according to an exemplary embodiment of the present invention (in addition to node position/orientation and antenna type) to determine the suitability of an antenna for a particular information exchange when EMCON restrictions prevail, and/or the off-board transmission power that can be used for a selected antenna to support that information exchange.

For completeness, the notification criterion specifies the parties to be notified of the EMCON policy or strategy, and the manner in which the criteria will be notified and monitored. Finally, authority defines the party or parties authorised to impose an EMCON condition in any particular case.

Referring now to FIG. 2 of the drawings, the intelligent management module 10 comprises a dynamic planning and management module 11 and a communications management system 42. In the example shown, the dynamic planning and management module 11 comprises a dynamic planner 40 and a manager 41, that provides an interface between the dynamic planner 40 and the communications management system 42, as will be described in more detail below.

In exemplary embodiments of the present invention (and as illustrated in FIGS. 2, 3A and 3B of the drawings), the intelligent communications management system 10 works cooperatively with the rest of the platform's systems/subsystems to achieve the mission goal: to provide information for situational awareness and safety purposes, and to receive information used in its decision making. In other words, at least parts of the node system 12 are communicably coupled to the communications management system 42 and the dynamic planning and management module 11. FIGS. 3A and 3B depict schematically this interaction for air-based systems and ground-based systems/airborne control station respectively.

The intelligent communications management system 10 receives a large quantity of information from different parts of the platform, which it can use in its decision-making processes, as described in more detail below. It is consequently mission-, motion- and network-aware and understands what resources it has to manage, as well as their performance capability. Mission-awareness provides information on what the platform is trying to achieve. There can be various operational modes, that might include normal operation, reconnaissance, under attack, attack, taxiing, landing etc. This is common to the entire platform and is of particular concern to the communications module 42. The communications module 42 monitors and evaluates current network performance, so it is network-aware. Network awareness information may also be shared with the dynamic planning and management 11 for planning purposes. Motion-awareness enables communications module 42 to intelligently route information along the best path to ensure connectivity to a fixed and/or mobile node is maintained, for example, in response to an unexpected and possibly sharp manoeuvre. The dynamic management and planning 11 is also motion-aware, in that it may receive a priori future route and/or manoeuvre plan in order to assess its impact on communications and to select suitable communications link (s), including antennas. The dynamic planning and management 11 is aware of other platform demands, such as emissions demands. It is thus mission-, network-, motion- and platform-aware, enabling the intelligent communications management module 10 to dynamically adapt and respond to unexpected events, e.g. change in mission priorities, mission environment and network conditions.

Referring back to FIG. 2 of the drawings, dynamic planners are also widely known and used in many different applications. As explained above, a dynamic planner 40 is typically provided in respect of, for example, a UAV for planning its route/path from a start point (typically, but not always) to a defined end point (and optionally including any defined waypoints therebetween), as well as planning its manoeuvre and/or trajectory. Known dynamic planners (path, manoeuvre and trajectory) tend to base their calculation on several factors, such as terrain, threat, weather, and platform constraints. For example, a manoeuvre may be calculated to avoid an airborne obstacle or a path may be calculated to minimise the probability of detection of the UAV. Other types of dynamic planners for route planning in many different applications will be known to a person skilled in the art and the present invention is not necessarily intended to be limited in this regard.

In this exemplary embodiment of the present invention, the management function 41 of the dynamic planning and management module 11 may be configured to interface with the dynamic planner 40, the communications management system 42 (for example, via a communications executive, as will be described in more detail below) and other parts of the node system 12. In this case, the management function 41 may be responsible for generating plan requests and providing attributes to the dynamic planner 40, evaluating new plans, selecting the best plan, requesting authorisation from the platform/pilot to execute the new plan (e.g. use a sensor system for communication purposes, manoeuvre a node), in order to optimise communications.

Referring to FIG. 3 of the drawings, in one exemplary embodiment of the present invention, a Communications Executive Function 141 or other type of interface function is provided within the communications management system 42 to enable it to interface with components internal and external to the communications management system 42, and particularly in this case for coupling a planning module 142 according to an exemplary embodiment of the present invention to a power controller 11b. The planning module or transmission power plan generating function 142 according to an exemplary embodiment of the present invention is depicted in FIG. 3 as residing within the communications management system 42, with a Communications Executive Function 141 facilitating an interface that enables a transmission power control plan to be transmitted from function 142 to the power controller 11b. More generally, it will be appreciated that the power selection function may reside in the communications system. In another embodiment, the power selection may be carried out by a dynamic planner, which resides outside the communications system, for example in mission management. Thus, for example, to avoid being 'heard' by an adversary, the dynamic planner may find the optimal transmission power (higher-level), whereas to improve signal quality to resolve communications issues, this can take place in the communications system (lower-level).

In the following method, according to an exemplary embodiment of the present invention, transmission power selection in aircraft (or other moving platform) communications systems is described in more detail. It will be appreciated that power selection methods according to various exemplary embodiments of the present invention can be part of a planning element, or be part of another system, such as the communications system or radio. For example, to avoid being detected or intercepted by an adversary, the dynamic planner finds the optimal transmission power (higher-level planning). It is therefore to be understood that the present invention is not necessarily intended to be in any way limited in this regard.

Power selection apparatus according to an exemplary embodiment of the present invention may form part of an emission management system configured to devise an Emissions Plan for communication purposes in response to a dynamic emissions control.

As explained above, in the event that it is determined that, due to an unplanned event, the energy radiated by an on-board antenna exceeds a predetermined threshold for EMCON, and in the case that an emissions management system is provided, it may be configured to generate a revised emissions plan, in which the transmission power is adjusted to an acceptable level, high enough to maintain an existing communications link with the recipient, but low enough to prevent detection or interception.

However, in alternative exemplary embodiments, a power selection apparatus may be provided, as a stand-alone unit or as part of another node management system, for effecting adaptive power control to dynamically adjust the transmission power of a communications system for the purpose of optimising communications whilst adhering to prevailing EMCON restrictions, extending communications range between nodes, or otherwise.

Figure 4:
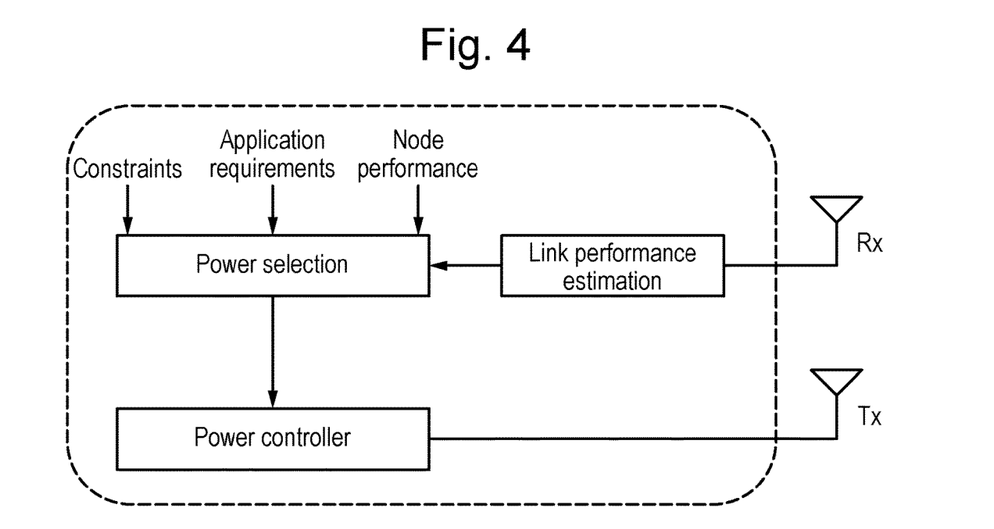
FIG. 4 is a schematic block diagram illustrating a power selection system for use in exemplary embodiments of the present invention.

Thus, referring to FIG. 4 of the drawings, the emission management system may further include a power selection unit coupled to a power controller, and a power controller to a power amplifier, wherein the power controller adapts the off-board transmission power based on the selected optimal transmission power for a given communications link, without violating EMCON restrictions.

Figure 5:
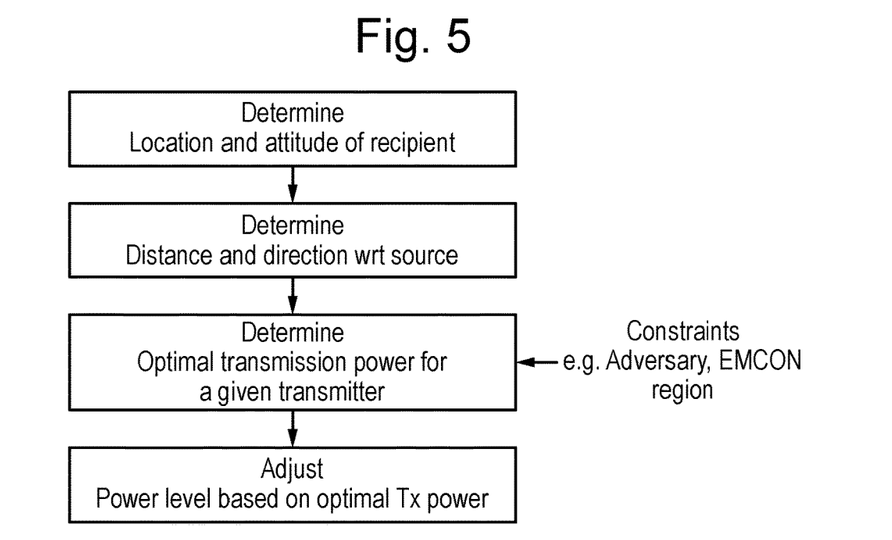
FIG. 5 is a flow chart illustrating the principal steps of a power control method according to an exemplary embodiment of the present invention.

FIG. 5 is a flow chart illustrating an exemplary embodiment for power selection for a given communications link. The method starts with determining the position and/or attitude of the recipient node. In one embodiment, the position and attitude of other node(s) can be obtained via in-mission updates. For example, the node broadcasts its own position and heading. In another embodiment, the position of a fixed node is determined by accessing the database. In yet another embodiment, the position of a mobile node is predicted based on past trajectory and heading data, for example, (shared via broadcasts). In yet another embodiment, location and attitude can be inferred from previously received messages from a node.

The method proceeds with determining a vector (in terms of distance and direction) between the source and recipient node.

The method proceeds with determining the optimal transmission power. This step may consider one or more of a plurality of parameters such as the distance between nodes, current/estimated signal quality at the recipient, antenna gain and pointing, losses (e.g. atmospheric and antenna pointing) and applications' communications requirement, as well as the prevailing EMCON restrictions. In one implementation, the signal quality at the recipient may be obtained via feedback messages.

The method proceeds with adjusting the transmission power based on the determined optimal transmission power.

Figure 6:
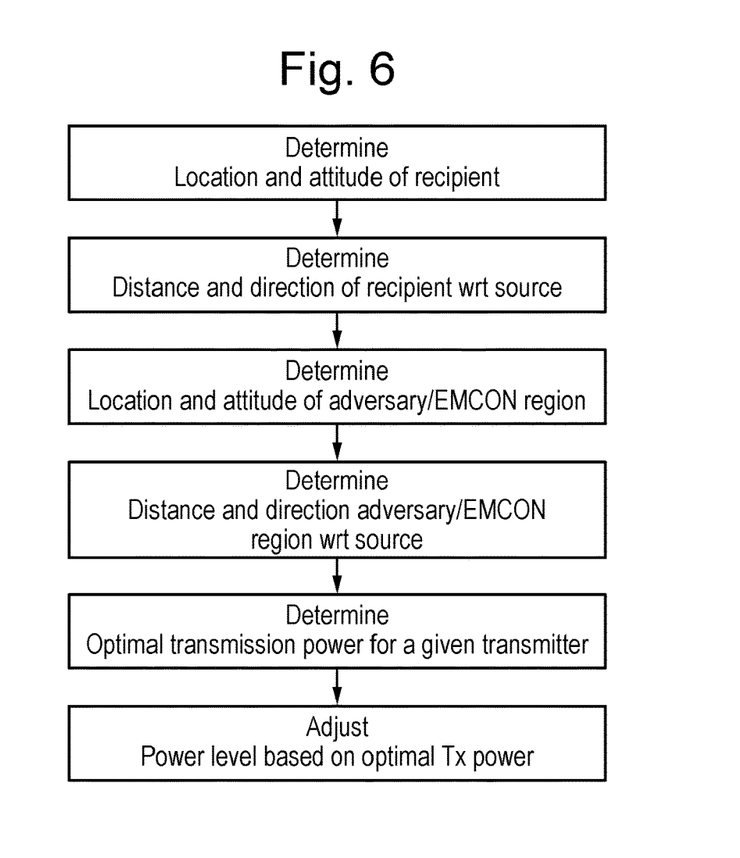
FIG. 6 is a flow diagram illustrating, in more detail, the steps of a power control method according to a specific exemplary embodiment of the present invention.

FIG. 6 is a flowchart illustrating, in more detail, an exemplary embodiment for power selection whilst under Emission control. To avoid being detected or intercepted by an adversary, the aim is to select the optimal transmission power that is high enough to effectively communicate, but low enough not to be detected.

The method starts with determining the position and/or attitude of the recipient node. The information can either be obtained via in-mission updates, determined by accessing a database, based on predicted past information or inferred from previously received messages from a node.

The method proceeds with determining a vector (in terms of distance and direction) between the source and recipient node.

The method proceeds with determining the position and/or attitude of the EMCON region or adversary. The information can either be obtained via in-mission updates or determined by accessing a database.

The method proceeds with determining a vector (in terms of distance and direction) between the node and EMCON region/adversary node.

The method proceeds with determining the optimal transmission power to achieve a desired link quality. This step considers a plurality of parameters such as the distance between nodes, transmitter power range, platform power budget, antenna gain and pointing, path losses (e.g. atmospheric and antenna pointing) and applications' communications requirement. This step assesses the signal quality (e.g. SNR) at the adversary for a given transmission power and is compared against a threshold, when finding the optimal transmission power. The selection is based on the transmission power that maximizes the signal quality (e.g. SNR) at the desired recipient to achieve the desired link quality, without being detected at the adversary or violating EMCON.

The method proceeds with adjusting the transmission power based on the determined optimal transmission power.

In another exemplary embodiment, there can be multiple adversaries spatially distributed and power selection considers their locations and selects the optimal transmission power to communicate with the recipient, without being detected or intercepted by the adversaries.

Multiple communications links and/or aircraft systems, such as sensors and navigation system, are co-located on the same platform. Simultaneous operation of the above may lead to significant signal degradation due to interference. When dynamically adapting the transmission power, the coexistence of others on the same platform may be compromised. Mitigating interference among other platforms sharing the same operational space also needs to be considered. Hence, power selection considers the coexistence of (i) other platforms and/or (ii) other operating communications links and systems co-located on the same platform, to select the optimal transmission power to communicate with the intended recipient(s), whilst minimising interference and avoiding detecting or interception.

According to an exemplary embodiment of the present invention, the dynamic planning and management module may interact with the Power Management system (co-located on the same platform) to approve the proposed transmission power, especially in the case where the proposed transmission power would exceed the transmission power budget set by the system designer or platform.

In the above-described embodiment, the emissions planning element actually produces a communications plan incorporating the emission control parameters as part of the planning process. In an alternative exemplary embodiment of the invention, an emissions management (or planning) module is provided that generates an emissions plan and then transmits the emissions plan, or data representative thereof, to a dynamic planning module, wherein it is the dynamic planning module that actually generates the communications plan using the emissions plan data accordingly.

Thus, in another exemplary embodiment, an emissions management module is provided for generating and updating an emissions plan for use by other on-board systems, such as the communications system or the sensor system and including apparatus according to an exemplary embodiment of the present invention. For example, the emissions plan, thus generated/updated, may be used by the dynamic communications planner 40 to generate a communications plan that meets information exchange requirements, whilst adhering to emissions control restrictions.

An exemplary embodiment of the invention may include an emissions management module configured to provide (and update) an emissions plan and make it available to other on-board systems with a view to providing a resource for:

management of emissions from the platform (i.e. controlling the level of emissions that the various parts of the system are allowed to make) to minimise the probability of the platform being detected passively through its own RF emissions; and management of measures taken to protect other (friendly) assets in the operational environment, i.e. controlling emissions that could potentially set off some types of munitions or interfere with a system on-board a neighbouring asset.

For communications, the emissions management module determines permissible communications resources in terms of, say, permissible waveforms as well as transmission power limit ('emissions limit'); whereas, for the sensor system, the relevant part of the emissions plan would define tasks which cannot be performed by the radar whilst adhering to current emissions control (EMCON) restrictions.

In an exemplary embodiment, the emissions plan may be updated if any or all of the following unplanned events occur:

appearance of pop-up threat(s);
a route change (e.g. to avoid a pop-up threat);
the aircraft mode changes (e.g. switching from autopilot to manual mode).

Figure 7:
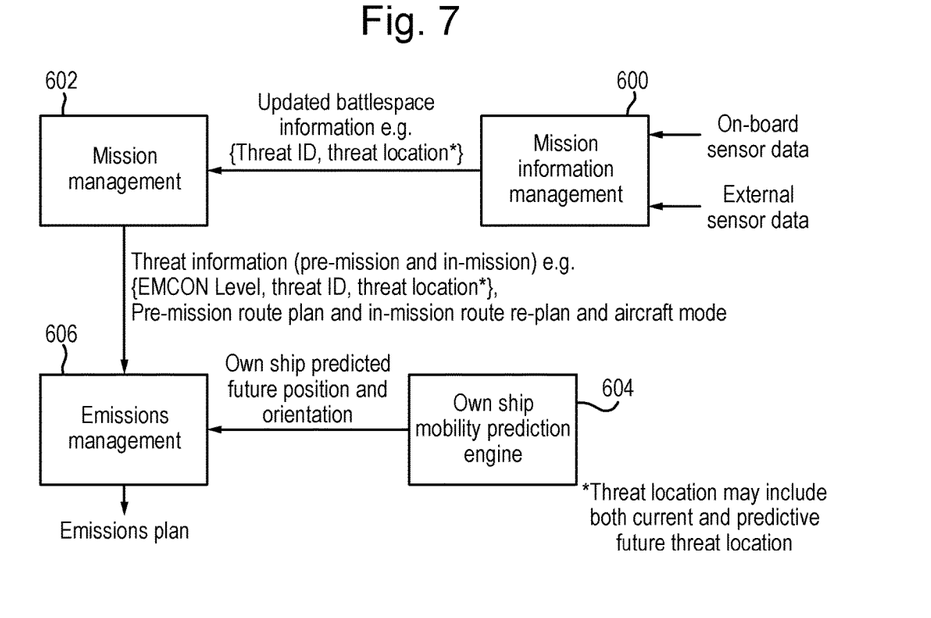
FIG. 7 is a schematic block diagram illustrating an emissions management apparatus according to an exemplary embodiment of the present invention.

Thus, referring to FIG. 7 of the drawings, an on-board management system according to an exemplary embodiment of the invention may comprise a mission information management module 600, a mission management module 602, an own ship mobility prediction engine 604 and an emissions management module 606.

The mission information management module 600 is configured to fuse data from external sources (e.g. teammate sensors), on-board sensors and datalinks to produce a degree of 'situational awareness' about threat entities and other entities (e.g. friends, neutrals and unknowns) in the operating space with respect ton the moving platform, as well as that of other entities.

The mission management module 602 receives situational awareness data from the mission information management module 600, for example, about a pop-up threat, and then determines the EMCON level for each threat and other entities that the on-board platform system(s) must adhere to. The mission management module 602 also has (or access to) data regarding pre-mission known threat location(s).

The emissions management module 606 receives data regarding the threat(s), such as threat location, threat type, threat category and the EMCON level for a given threat, as well as information concerning friendly or other assets ('Other Asset Location'). Threat Location and Other Asset Location data are expressed in three dimensions: latitude, longitude and altitude. Furthermore, location data may include current threat location, location error in three dimensions and predicted future location, e.g: current threat location+threat location error+predicted future threat location.

The emissions management module 606 also receives data regarding the movement of its own platform, such as (from the mission management module 602) predetermined route plan or updated route plan (e.g. generated to avoid a pop-up threat), and (from the own ship mobility prediction engine 604) future prediction information about its own platform.

Figure 8:
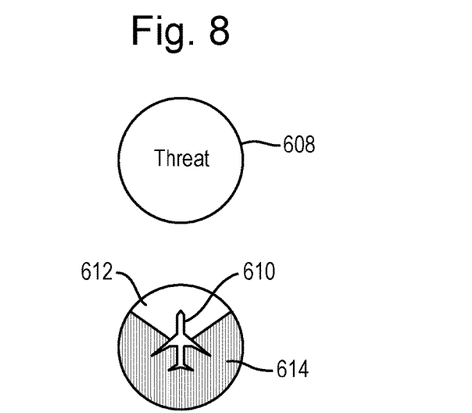
FIG. 8 is a schematic diagram illustrating the extent of emissions plans generated by apparatus according to an exemplary embodiment with reference to a moving platform and a threat.

Based on the above-mentioned information, the emissions management module generates an emissions plan in the direction of the threat and/or other entities. For example, and referring to FIG. 8 of the drawings, a threat 608 and a mobile platform 610 is illustrated schematically. An emissions plan, generated by an emissions management module on-board the mobile platform 610, identifies permissible resources per direction. Thus, in the illustrated example, there is an emissions plan in the direction of the threat (segment 612) and there is another emissions plan in other directions, in this case where there is no threat (segment 612). The permissible resources identified in the emissions plan(s) may comprise permissible waveform(s), emissions duration, etc. as well as transmission power (or 'upper emissions limit').

In one exemplary embodiment, an Emissions Plan may be generated based on a pre-planned route and pre-mission static, known threat(s). In another exemplary embodiment, an Emissions Plan is generated based on a pre-planned route and (static or dynamic) pop-up threat(s). In yet another exemplary embodiment, an Emissions Plan is generated based on dynamic movement of own aircraft and a dynamic pop-up threat(s). For example, dynamic movement of own aircraft means that the aircraft is no longer following a pre-planned route (for a manned aircraft, pilot has taken over).

Figure 9:
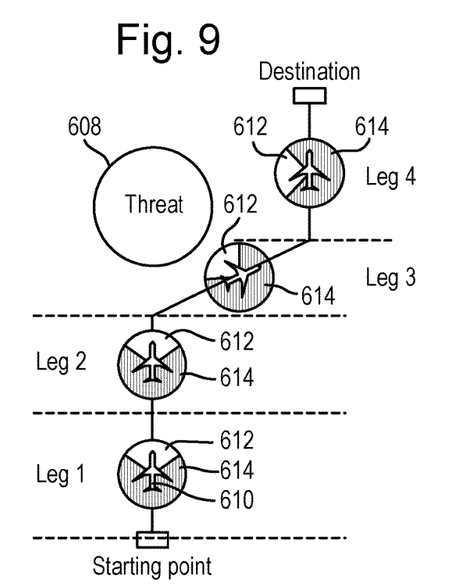
FIG. 9 is a schematic diagram illustrating the principles of generating an emissions plan in respect of each of a plurality of legs of a route of a moving platform.

FIG. 9 of the drawings illustrates an example of a pre-planned route an aircraft 610 will follow and location of a static threat. The emissions management module generates one or more Emissions Plans as the aircraft flies its pre-planned route. It uses the pre-determined route plan to generate the Emissions Plans. Thus, for each leg or segment along the route, there is an Emissions Plan in the direction of the threat 608 (segment 612) and in other directions (segment 614).

In another exemplary embodiment, when the pilot takes over (i.e. aircraft mode is no longer on autopilot), for example to pursue a threat, then the aircraft will no longer be flying a pre-planned route. In such a case, the emissions management module cannot use the pre-planned route to generate an Emissions Plan. Hence, a prediction engine 604 is required to predict future location of its own ship (aka own aircraft). This information is then used by the emissions management module to generate an Emissions Plan. Note: future prediction data may also be combined with current and historical known location to provide a better understanding about future location of its own ship.

The Emissions Plan(s) can be generated pre-mission for the entire route, based on the known Route Plan. In such a case, any changes to the route or appearance of new threats may require a full re-plan. Alternatively, the Emissions Plan(s) can be dynamically carried out in-mission, making it more adaptable to any unplanned events; the process is carried out between waypoints, for example; this process can be referred to as forward Emissions Planning.

Figure 10:
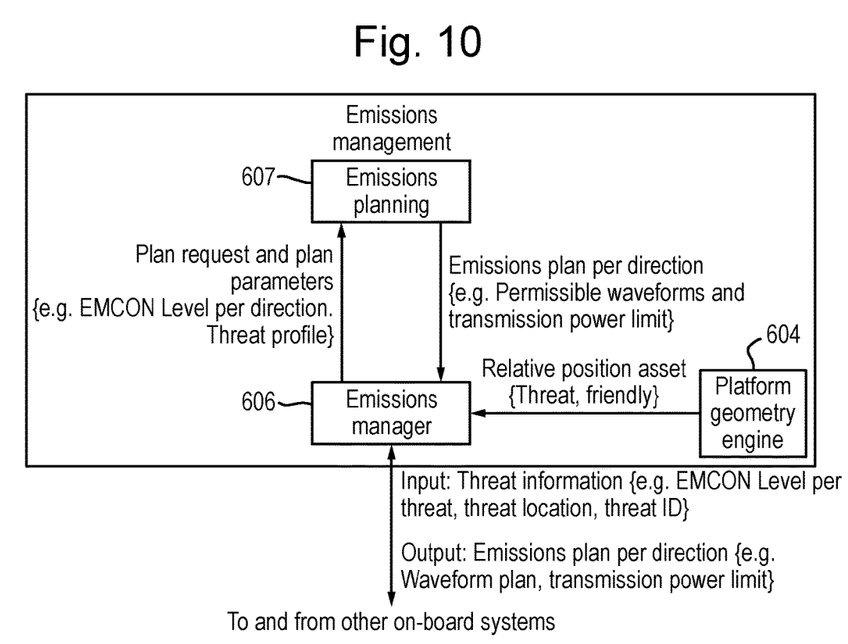
FIG. 10 is a schematic block diagram illustrating an emissions management module according to an exemplary embodiment of the present invention.

The following describes an embodiment of the emissions management module for use in apparatus according to an exemplary embodiment of the present invention. Referring to FIG. 10 of the drawings, there may be three principal functions within the emissions management module: an Emissions Manager 606; one or more Emissions Planner(s) 607; and a Platform Geometry Engine 604.

An Emissions Manager 606 interfaces with the Emissions Planner 607, Platform Geometry Engine 604 and with external on-board systems, such as Mission Management, and Communications Planning and Management system.

An Emissions Planner 607 determines permissible resources per direction, such as permissible Waveforms and transmissions power limit.

A Platform Geometry Engine 604 determines relative position to threat and to non-threat assets (in terms of Azimuth, Elevation and Slant Range).

A method for use in an exemplary embodiment of the invention can be described as follows:

1. Emissions Manager 606 receives information (from Mission Management) regarding the threat(s), such as threat location, threat ID and EMCON Level for a given threat, as well as receiving information about non-threat assets.
2. Platform Geometry Engine 604 receives threat and/or non-threat information, for example location data in terms of longitude, latitude and altitude, as well as own aircraft location data. Based on the received information, Platform Geometry Engine determines the relative position to threat (in terms of azimuth, elevation, and slant range) and/or relative position of own ship to non-threat (e.g. friendly assets). Relative Position information for a given threat and/or non-threat asset is then made available to the Emissions Manager.

Note: Relative Position information may be provided as a range, for example {AZmin to AZmax, ELmin to ELmax, SLANTmin to SLANTmax}.

3. The Emissions Planner 607 receives from the Emissions Manager a request for an emissions plan and associated plan parameters; plan parameters include non-threat/Threat ID (e.g. type), relative position to threat and non-threat, and EMCON Level per threat/non-threat.
4. The Emissions Planner 607 also has access to pre-defined look-up tables, which it uses in its planning. Pre-mission defined tables provide relevant information to the planner to enable it to generate an appropriate Emissions Plan for different EMCON Levels, threat types and non-threat types. It also has information regarding the different threat types and non-threat types, such as receiver sensitivity and frequency band(s).
5. The Emissions Planner 607 determines permissible Waveform(s) and associated Emissions Limit (e.g. transmission power, emissions duration) in a given direction, using the abovementioned information. It then submits the Emissions Plan to the Emissions Manager for validation.
6. Once the received Emissions Plan is validated by the Emissions Manager, the Emissions Manager 606 then publishes the Emissions Plan. The Emissions Plan(s) are then used by the Communications Planning and Management function and/or Sensing Management function.

Emissions Planning

For specific EMCON Levels, the permissible Waveforms and upper Emissions Limit (e.g. transmission power) can be determined pre-mission. The permissible waveforms and power limits for specific EMCON Levels can be obtained from pre-mission defined look-up tables. For example, for a specific EMCON Level, all waveforms are permissible and there is no transmissions power restriction, in a particular direction. In another example, for another EMCON Level, no waveforms are permissible and there is no transmissions power is allowed, in a particular direction.

For other EMCON Levels, the permissible waveform and upper Emissions Limit (e.g. transmission power) is determined in-mission. The upper Emissions Limit (transmission power and emissions duration) will need to be calculated based on threat information (e.g. threat type, receiver sensitivity and relative position to threat), and the permissible Waveform(s) will depend on the type of threat.

The upper Emissions Limit depends on what the aircraft is trying to achieve.

A. For example, if the aim is to avoid detection (i.e. the aircraft's transmission cannot be heard by the threat), the Emissions Limit is set to below the threat's receiver sensitivity to detect an RF signal; the emissions limit can be based on maximum permissible EIRP, in a given direction.

The "Effective Isotropic Radiated Power" (EIRP) (used to determine the Emissions Limit) can be calculated by using the well-known Friis Equation.

B. In another example, the aircraft's transmission can be heard by the threat, but the transmission time must not be long enough for threat to lock on and decode it. Thus, the upper Emissions Limit may include an emissions duration value, as well as a transmissions limit; the transmission limit can be expressed in terms of Energy, which is a function of the threat's lock-on period.

If the platform needs to protect other non-threat assets in the operational environment (e.g. controlling emissions that could potentially set off some types of munitions or protect against interference with a system on-board another asset), then an Emissions Plan in the direction of the friendly asset is generated. The Emissions Plan may identify a subset of permissible waveforms and an Emissions Limit, based on non-threat information, such as non-threat location and non-threat profile (e.g. receiver sensitivity, frequency bands).

It will be apparent to a person skilled in the art, from the foregoing description, that modifications and variations can be made to the described embodiments without departing from the scope of the invention as defined by the appended claims.

What is claimed is:

1. Apparatus for a communications system of a moving platform comprising a plurality of systems, at least one platform application, and a communications module comprising at least one wireless communications link and configured to effect wireless data communication, wherein said apparatus comprises a communications planning module configured to:
   receive data representative of a communications requirement between said platform and a recipient node;
   identify a communications link for supporting said communications requirement;
   determine, using attribute data representative of a position and/or orientation of said platform relative to said recipient node, a distance and direction of said recipient node with respect to said platform;
   receive data representative of prevailing emissions control restrictions including an upper emissions limit defining a maximum transmission power permitted to be utilised by an on-board antenna or portion of aperture antenna and an emissions duration value having calculations comprising a threat type and an ability to lock onto a detected signal;
   determine an optimal transmission power, within said upper emissions limit, of said identified communications link taking into account at least said distance of said recipient node with respect to said platform; and
   cause the transmission power of said identified communications link to be set to said optimal transmission power.

2. The apparatus according to claim 1, configured to predict said attribute data from past trajectory and heading data in respect of said recipient node and/or infer said attribute data from previously-received messages from said recipient node.

3. The apparatus according to claim 1, configured to obtain said attribute data by accessing or retrieving, from a storage module, position and/or orientation data in respect of said recipient node.

4. The apparatus according to claim 1, configured to receive position and/or orientation data from said platform and/or said recipient node.

5. The apparatus according to claim 1, further configured to determine said optimal transmission power using data representative of one or more of: distance between said platform and said recipient node, distance between said platform and an emissions control region/adversary node, current/estimated signal quality at said recipient node, transmission power of said communications link, platform power budget, antenna gain, antenna pointing, losses, and communications requirements of said at least one platform application.

6. The apparatus according to claim 5, configured to determine said optimal transmission power using data representative of location of other communications links and/or systems of said platform and their operational characteristics in respect of said platform and/or location of other nodes in the operational environment of said platform and their operational characteristics, with a view to minimising interference.

7. The apparatus according to claim 5, configured to receive data representative of said current signal quality from said recipient node, and to selectively alter said optimal transmission power on the basis of said received data.

8. The apparatus according to claim 5, configured to receive data representative of a current signal quality from said communications link on said platform, and to selectively alter said optimal power transmission on the basis of said received data.

9. The apparatus according to claim 1, configured to detect a change in distance and/or direction between said platform and said recipient node, determine a revised optimal transmission power, and cause said transmission power of said identified transmitter to be set to said revised optimal transmission power.

10. The apparatus according to claim 1, configured to generate a transmission power control plan using said optimal transmission power, and transmit said transmission power control plan to a power controller of said communications system.

11. The apparatus according to claim 10, configured to provide data representative of said transmission power control plan to a system/subsystem of said platform with a request for authorisation, wherein a dynamic planning and management module associated with said platform is configured to receive, from said system subsystem of said platform, data indicative of a positive or negative authorisation response.

12. The apparatus according to claim 1, wherein the communications planning module is configured to receive updated data representative of prevailing emissions control restrictions, including an updated upper emissions limit, determine a new optimal transmission power, within said upper emissions limit, and cause the transmission power of said identified communications link to be set to said new optimal transmission power.

13. An intelligent communications management system for a moving platform comprising a communications system, a plurality of functional systems and at least one wireless communications link and being configured to effect wireless data communication, the system further comprising apparatus according to claim 1.

14. A method for communications management in a communications system of a moving platform comprising a plurality of systems, at least one platform application, and a communications module comprising at least one wireless communications link and configured to effect wireless data communication, the method comprising:

receiving data representative of a communications requirement between said platform and a recipient node;

identifying a communications link for supporting said communications requirement;

determining, using attribute data representative of a position and/or orientation of said platform relative to said recipient node, a distance and direction of said recipient node with respect to said platform;

receiving data representative of prevailing emissions control restrictions including an upper emissions limit defining a maximum transmission power permitted to be utilised by an on-board antenna or portion of aperture antenna and an emissions duration value having calculations comprising a threat type and an ability to lock onto a detected signal;

determining an optimal transmission power, within said upper emissions limit, of said identified communications link taking into account at least said distance of said recipient node with respect to said platform; and causing the transmission power of said identified communications link to be set to said optimal transmission power.

* * * * *